United States Patent
Lopez et al.

(10) Patent No.: US 11,593,205 B2
(45) Date of Patent: Feb. 28, 2023

(54) SERVICING DATA STORAGE DEVICES IN A DATA STORAGE ARRAY

(71) Applicant: International Business Machines Corporation, Armonk, NY (US)

(72) Inventors: Rodolfo Lopez, Austin, TX (US); Stephen M. Tee, Marble Falls, TX (US); Zhibao Hu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 154 days.

(21) Appl. No.: 17/110,042

(22) Filed: Dec. 2, 2020

(65) Prior Publication Data

US 2022/0171677 A1    Jun. 2, 2022

(51) Int. Cl.
| | |
|---|---|
| *G06F 11/00* | (2006.01) |
| *G06F 11/10* | (2006.01) |
| *G06F 3/06* | (2006.01) |
| *G06F 11/07* | (2006.01) |
| *G06F 11/16* | (2006.01) |
| *G06F 11/22* | (2006.01) |
| *G06F 11/30* | (2006.01) |

(52) U.S. Cl.
CPC ........ *G06F 11/1092* (2013.01); *G06F 3/0619* (2013.01); *G06F 3/0635* (2013.01); *G06F 3/0652* (2013.01); *G06F 3/0659* (2013.01); *G06F 3/0689* (2013.01); *G06F 11/0772* (2013.01); *G06F 11/1658* (2013.01); *G06F 11/2268* (2013.01); *G06F 11/3034* (2013.01)

(58) Field of Classification Search
CPC ............. G06F 11/1092; G06F 11/0772; G06F 11/1658; G06F 11/1088
See application file for complete search history.

(56) References Cited

U.S. PATENT DOCUMENTS

| | | |
|---|---|---|
| 5,522,031 A | 5/1996 | Ellis et al. |
| 9,519,556 B2 | 12/2016 | Joshi et al. |
| 2002/0135350 A1 | 9/2002 | Wolski et al. |
| 2005/0182899 A1* | 8/2005 | Suzuki ............... G06F 11/1096 711/170 |
| 2014/0215262 A1 | 7/2014 | Li et al. |
| 2016/0188424 A1* | 6/2016 | Walls .................. G06F 11/1662 714/6.3 |

(Continued)

OTHER PUBLICATIONS

Intellectual Property Office, Combined Search and Examination Report under Sections 17 and 18(3) for Application GB2116547.7 dated Jun. 24, 2022.

*Primary Examiner* — Philip Guyton
(74) *Attorney, Agent, or Firm* — Patterson + Sheridan, LLP

(57) ABSTRACT

Systems and methods for replacing and testing a data storage device are disclosed. In disclosed embodiments, a system including a data storage array (DSA) including a plurality of data storage devices (DSDs) in an enclosure. The system further includes an I/O server coupling the DSA to a client node and configured to provide data access between the client node and the DSA. The system further includes a management server coupled to the DSA, configured to detect a failed DSD in the DSA, detect a replacement DSD in the enclosure that replaces the failed DSD, and add the replacement DSD to a logical path of the DSA. The management server is further configured to display an indication of a state of the DSA based on the comparing.

14 Claims, 4 Drawing Sheets

(56) References Cited

U.S. PATENT DOCUMENTS

2017/0075762 A1    3/2017    Hendrickson et al.
2020/0042388 A1*    2/2020    Roberts ............... G06F 11/1088
2022/0171677 A1*    6/2022    Lopez ................. G06F 11/1088

* cited by examiner

SERVICING DATA STORAGE DEVICES IN A DATA STORAGE ARRAY

BACKGROUND

The present invention relates to data storage arrays, and more specifically, to the management of data storage arrays.

As data storage systems become increasingly large and complex, the need for robust maintenance tools to scale operator capability is an important aspect of software defined data center management.

Enterprise RAID systems attempt to provide required functionality for servicing data storage devices (DSDs) such as hard disks storage devices. Conventional approaches require large resources for servicing such systems, making scaling difficult as data storage systems grow to accommodate ever-growing needs of data storage.

SUMMARY

According to one embodiment of the present invention, a system is disclosed including a data storage array (DSA) comprising a plurality of data storage devices (DSDs) in an enclosure, and the DSA is configured to distribute redundant copies of data between the plurality of DSD's on a logical path of the DSA. The system further includes an I/O server coupling the DSA to a client node and configured to provide data access between the client node and the DSA. The system further includes a management server coupled to the DSA. In embodiments, the management server is configured to detect a failed DSD in the DSA. The management server is further configured to store a first log comprising a first state of the DSA and the I/O server. The management server is further configured to remove the failed DSD from the logical path of the DSA. The management server is further configured to distribute the redundant copies of data between the plurality of DSDs in the logical path of the DSA. The management server is further configured to detect a replacement DSD in the enclosure that replaces the failed DSD. The management server is further configured to add the replacement DSD to the logical path of the DSA. The management server is further configured to store a second log comprising a second state of the DSA and the I/O server. The management server is further configured to compare the first log and second log and display an indication of a state of the DSA based on the comparing.

In certain embodiments, a computer program product for data storage device replacement and test is disclosed, the computer program product which has a computer-readable storage medium having computer-readable program code embodied therewith. In certain embodiments, the computer-readable program code is executable by one or more computer processors to detect a failed data storage device (DSD) in a data storage array (DSA). The computer-readable program code is further executable to store a first log comprising a first state of the DSA and an I/O server. The computer-readable program code is further executable to remove the failed DSD from a logical path of the DSA. The computer-readable program code is further executable to distribute redundant copies of data between the plurality of DSDs in the logical path of the DSA. The computer-readable program code is further executable to detect a replacement DSD in an enclosure that replaces the failed DSD. The computer-readable program code is further executable to add the replacement DSD to the logical path of the DSA. The computer-readable program code is further executable to store a second log comprising a second state of the DSA and the I/O server. The computer-readable program code is further executable to compare the first log and second log and display an indication of a state of the DSA based on the comparing.

In further embodiments, a method for data storage device replacement and test is disclosed, including detecting a failed data storage device (DSD) in a data storage array (DSA). The method further includes storing a first log comprising a first state of the DSA and an I/O server. The method further includes removing the failed DSD from a logical path of the DSA. The method further includes distributing redundant copies of data between the plurality of DSDs in the logical path of the DSA. The method further includes detecting a replacement DSD in an enclosure that replaces the failed DSD. The method further includes adding the replacement DSD to the logical path of the DSA. The method further includes storing a second log comprising a second state of the DSA and the I/O server. The method further includes comparing the first log and second log, and displaying an indication of a state of the DSA based on the comparing.

DETAILED DESCRIPTION

In the following, reference is made to embodiments presented in this disclosure. However, the scope of the present disclosure is not limited to specifically described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, a reference to "the invention" shall not be construed as a generalization of any inventive subject matter disclosed herein and shall not be considered to be an element or limitation of the appended claims except where explicitly recited in a claim(s).

Figure 1:
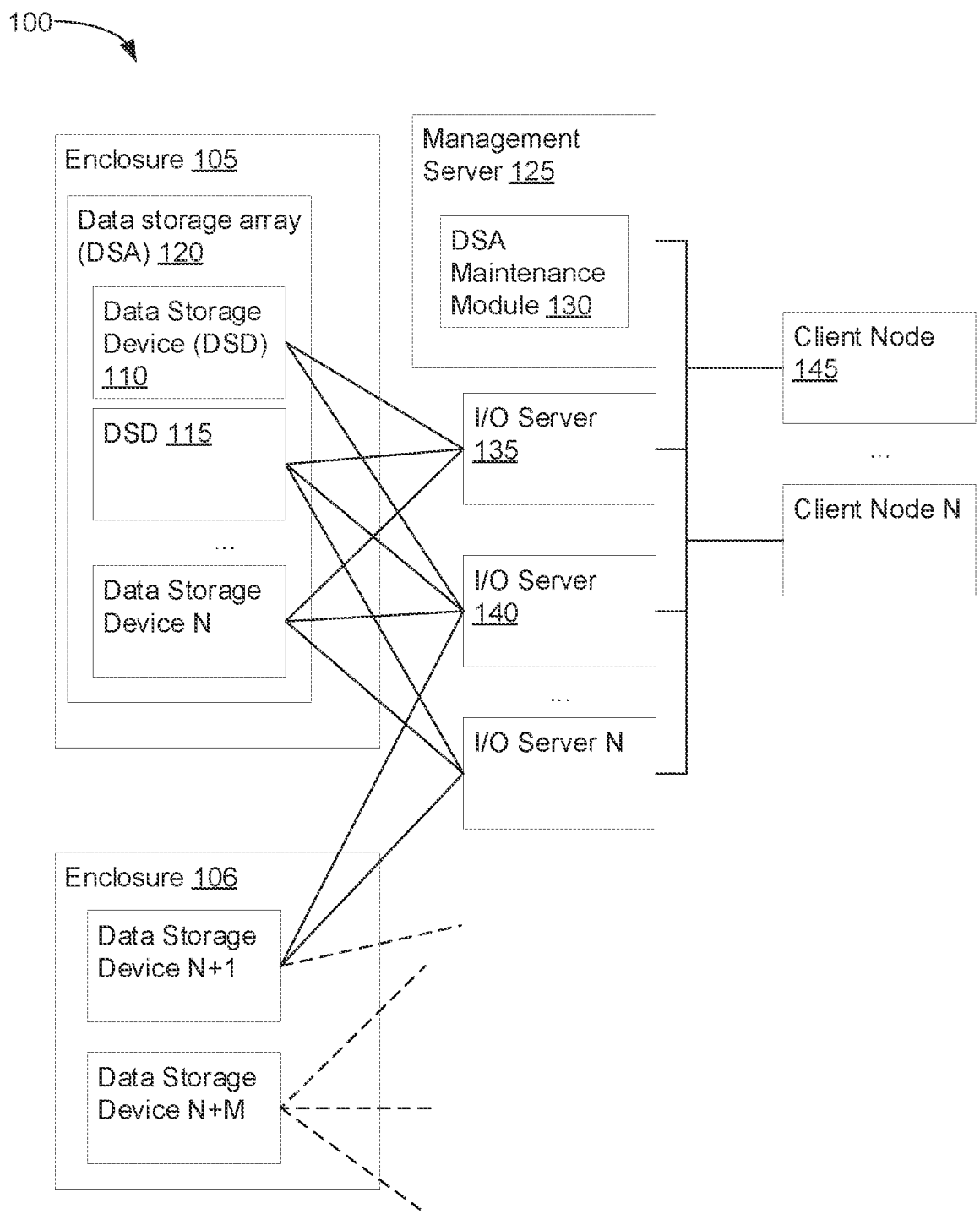
FIG. 1 depicts a system for disk replacement and test, according to certain embodiments.

FIG. 1 depicts a system 100 for disk replacement and test, according to certain embodiments. System 100 includes an enclosure 105 for holding one or more data storage devices (DSDs), such as DSD 110, DSD 115, through DSD N. Enclosure 105 may be any type of physical enclosure capable of holding a DSD, such as a cabinet, drawer, drum, tower, or other physical structure. A DSD may be any type of device capable of storing computer-readable data, such as a hard drive, solid-state drive, non-volatile memory, volatile memory, or other devices capable of storing data. Groups of DSDs such as DSD 110 through DSD N may be configured as a data storage array (DSA) such as DSA 120. Data storage array 120 may be a RAID type array, a declustered array, or configured to store data based on a redundant data storage strategy that is capable of being implemented on a DSD. A DSA may comprise a system similar to an IBM Spectrum Scale Native GPFS RAID, sold by IBM, as well as other commercially available data storage arrays systems that utilize RAID and declustered storage technologies. In some embodiments, DSA 120 may be virtually configured, while in other embodiments, DSA 120 may include physical architecture governing the redundant storage strategy coupled to each DSD of DSA 120.

System 100 further includes a management server 125 that manages one or more of the components of system 100. Management server 125 includes DSA maintenance module 130 to execute computer readable instructions for replacement and testing of DSDs of DSA 120, discussed in greater detail in connection with FIGS. 2 and 3. Management server 125 may comprise one or more processors and memories, that may be located locally in a single computer system, while in some embodiments one or more components of the management server may be located remotely and accessed via a network. Management server 125 manages interactions (i.e., data storage and retrieval) between one or more I/O servers, and client nodes.

System 100 further includes a plurality of I/O servers, such as I/O server 135 and 140, through I/O server N, configured to provide and receive data to DSA 120 based on instructions received from one or more client nodes, such as client node 145. Client node 145 in this context may be a singular computer, multiple computers, or networks of computers that utilize access to data housed on the DSA 120 via one or more I/O server.

Figure 2:
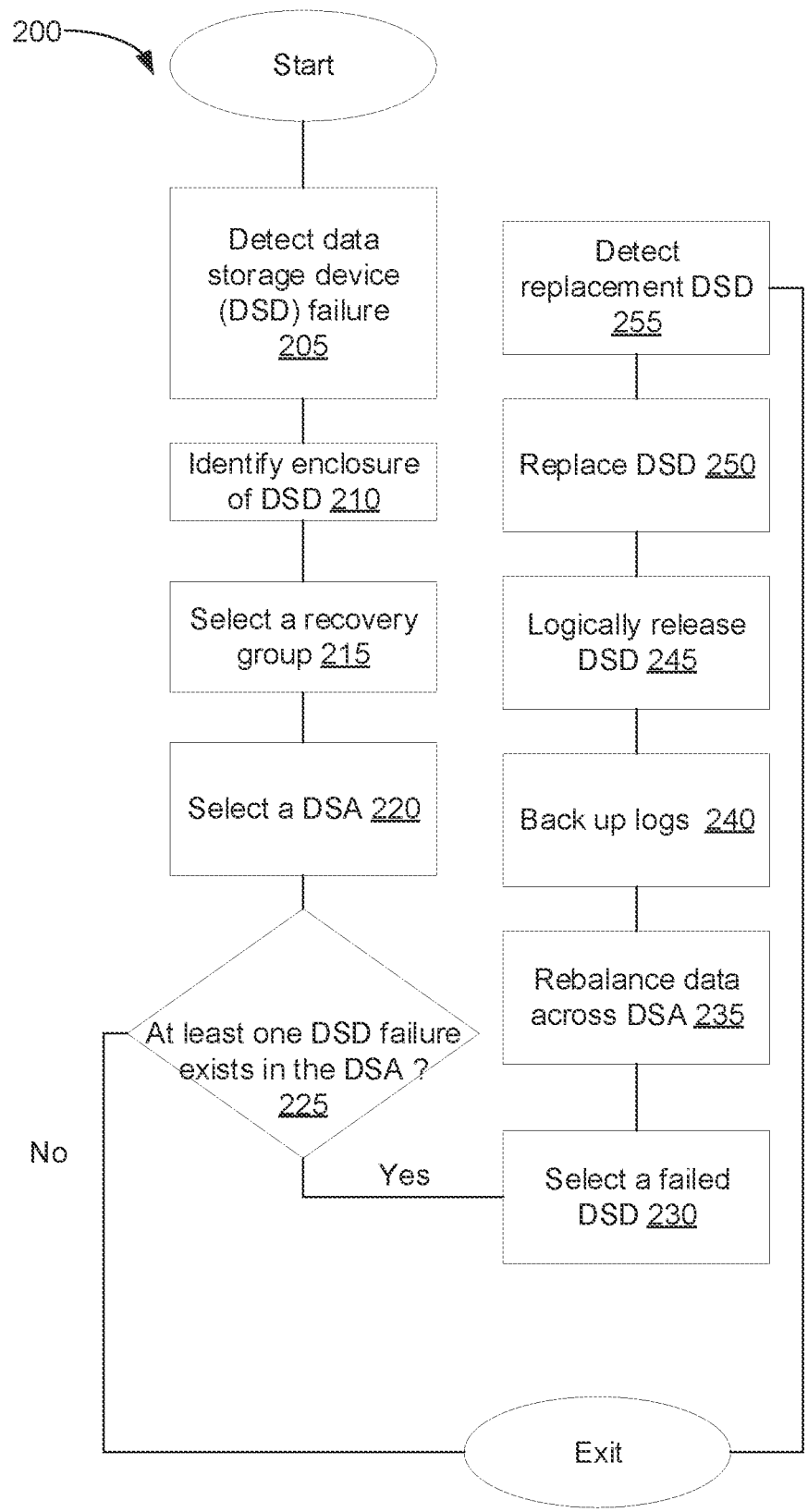
FIG. 2 depicts a flow diagram for detecting and replacement of a data storage device (DSD), according to certain embodiments.

FIG. 2 depicts a flow diagram 200 for detecting and replacement of a DSD, according to certain embodiments. The actions of flow diagram 200 are executed based on computer-readable instructions received from DSA maintenance module 130 of FIG. 1.

At 205, the DSA maintenance module 130 detects a failure mode for a DSD, while at 210, an enclosure containing the DSD having the failure mode is identified, such as enclosure 105. At 215, the DSA maintenance module 130 receives a selection for a recovery group that includes the failed DSA, the recovery group being part of a DSA containing the failed DSD, such as DSA 120.

At 225, the DSA maintenance module 130 confirms that there is at least one failed DSD in the DSA, obtaining a status of each DSD in the DSA. If there is no failed DSD, the flow diagram 200 exits. If there is a failed DSD in the DSA, the DSA maintenance module 130 receives a selection of the failed DSD at 230.

Once the failed DSD is determined, the DSA maintenance module 130 issues a series of commands for the DSA to rebalance its stored data across the DSDs that were not selected at 235, and stores logs of one or more of the DSA such as DSA 120, one or more I/O servers coupled to the DSA such as I/O server 135 and I/O server 140, and a management server such as management server 125.

Once the logs have been backed up at 240, the failed DSD is logically released at 245. In this context, "logical release" means removal from the logical path of the DSA hosting the failed DSD, and removing the DSD from further communication with another component of a system such as system 100 of FIG. 1. At 250, the failed DSD is replaced, and the DSA maintenance module 130 detects at 255 that the replacement of a DSD has taken place.

Figure 3:
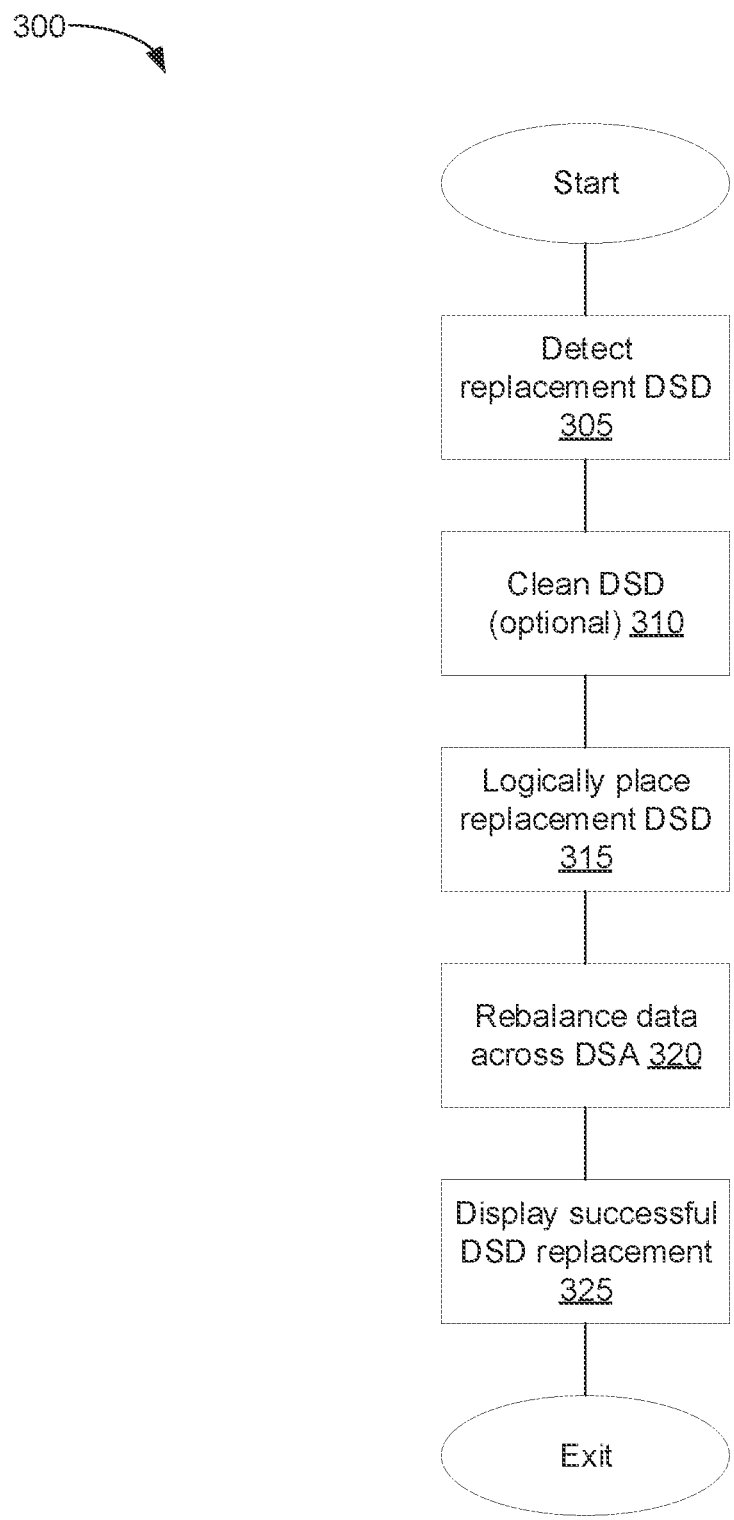
FIG. 3 depicts a flow diagram showing the execution process of detecting a replacement DSD through successful DSD replacement, according to disclosed embodiments.

FIG. 3 depicts a flow diagram 300 showing the execution process of detecting a replacement DSD through successful DSD replacement, according to disclosed embodiments. At 305, DSA maintenance module 130 of FIG. 1 detects a replacement DSD in a DSA, such as DSA 120 of FIG. 1. When a DSD is replaced, it may be the case that the replacement DSD has been previously used and is not new. In order to detect whether or not a DSD is used, DSA maintenance module 130 reads one or more DSD metadata sectors to see if any data has been written. If there has been data written in the replacement DSD metadata sectors, the DSA maintenance module 130 delivers commands to the replacement DSD to erase all of its metadata contents at 310.

Once cleaned (if needed), the replacement DSD is placed in the logical path of the DSA so that it may be accessed as part of the DSA at 315. Furthermore, once the replacement DSD is in the logical path of the DSA, the DSA rebalances its data across all DSDs on its logical path at 320, displaying successful DSD replacement to a user at 325.

Figure 4:
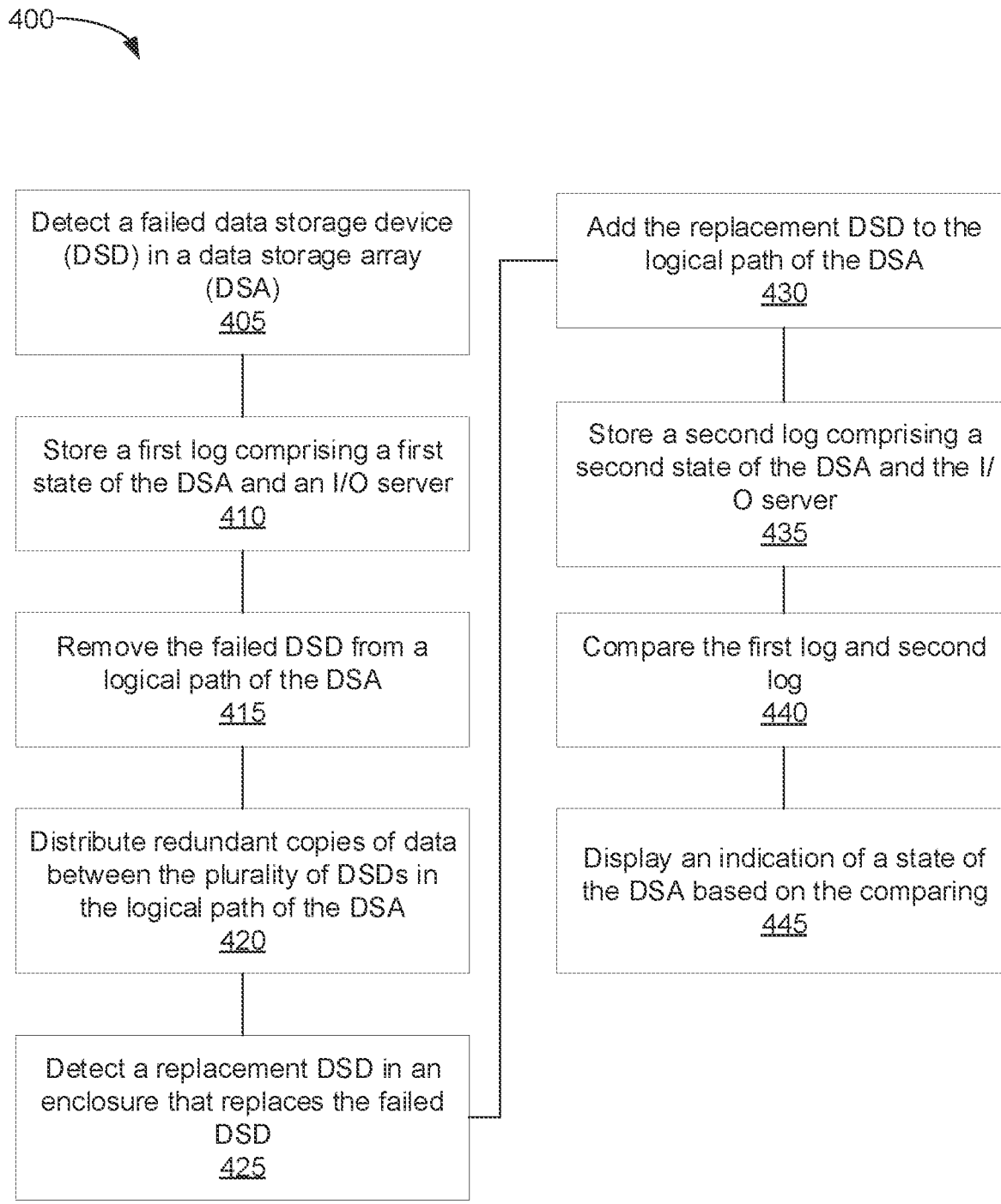
FIG. 4 depicts a method for DSD replacement and test, according to disclosed embodiments.

FIG. 4 depicts a method 400 for DSD replacement and test, according to disclosed embodiments. In certain embodiments, method 400 is executed as computer-readable instructions by a DSA maintenance module such as DSA maintenance module 130 of FIG. 1.

At 405 the method 400 detects a failed data storage device (DSD) in a data storage array (DSA) and at 410 stores a first log comprising a first state of the DSA and an I/O server. In certain embodiments, detecting the failed DSD in the DSA includes detecting that the DSA has removed the failed disk from a logical definition of the DSA. In certain embodiments, the DSA is one of a declustered array and a RAID array. In certain embodiments detecting a failed DSD in the DSA includes placing a good DSD of the plurality of DSD's in a failed state.

At 415 the method 400 removes the failed DSD from a logical path of the DSA and distributes redundant copies of data between the plurality of DSDs in the logical path of the DSA at 420.

At 425 the method 400 detects a replacement DSD in an enclosure that replaces the failed DSD and adds the replacement DSD to the logical path of the DSA at 430. In certain embodiments, detecting a replacement DSD in the enclosure includes displaying on the failed DSD an indicator to remove the failed DSD.

At 435, the method 400 stores a second log comprising a second state of the DSA and the I/O server, compares the first log and second log at 440, and at 445 displays an indication of a state of the DSA based on the comparing.

Embodiments of method 400 may further include distributing the redundant copies of data between a plurality of DSDs in the logical path of the DSA after placing the replacement DSD in the logical path of the DSA. Certain further embodiments may include reading data in a metadata sector of the replacement DSD and erasing the data in the metadata sector.

In the preceding, reference is made to embodiments presented in this disclosure. However, the scope of the present disclosure is not limited to specifically described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., via a client node such as client node 145) or related data available in the cloud. For example, the systems and methods disclosed herein could execute on a computing system in the cloud and perform a method of DSD replacement and test in the context of the cloud computing environment. In such a case, the systems and methods disclosed herein could monitor ongoing operations of DSDs and DSAs that comprise the cloud environment, storing information related to such monitoring, to make this data available to other applications for inspection and analysis. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system comprising:
a data storage array (DSA) comprising a plurality of data storage devices (DSDs) in an enclosure, the DSA configured to distribute redundant copies of data between the plurality of DSD's on a logical path of the DSA;
an I/O server coupling the DSA to a client node and configured to provide data access between the client node and the DSA; and
a management server coupled to the DSA, configured to:
detect a failed DSD in the DSA, comprising:
detecting that the DSA has removed the failed DSD from a logical definition of the DSA;
store a first log comprising a first state of the DSA and the I/O server;
remove the failed DSD from the logical path of the DSA;
distribute the redundant copies of data between the plurality of DSDs in the logical path of the DSA;
detect a replacement DSD in the enclosure that replaces the failed DSD;
determine, based on reading data in a metadata sector of the replacement DSD, that the replacement DSD is used, and in response erase all data in the metadata sector;
add the replacement DSD to the logical path of the DSA;
store a second log comprising a second state of the DSA and the I/O server;
compare the first log and second log; and
display an indication of a state of the DSA based on the comparing.

2. The system of claim 1, the management server further configured to distribute the redundant copies of data between the plurality of DSDs in the logical path of the DSA after placing the replacement DSD in the logical path of the DSA.

3. The system of claim 1 wherein the DSA is one of a declustered array and a RAID array.

4. The system of claim 1 wherein detecting a failed DSD in the DSA comprises placing a good DSD of the plurality of DSD's in a failed state.

5. The system of claim 1 wherein detecting a replacement DSD in the enclosure comprises displaying on the failed DSD an indicator to remove the failed DSD.

6. A computer program product for data storage device replacement and test, the computer program product comprising:
a computer-readable storage medium having computer-readable program code embodied therewith, the computer-readable program code executable by one or more computer processors to:
detect a failed data storage device (DSD) in a data storage array (DSA), comprising:
detecting that the DSA has removed the failed DSD from a logical definition of the DSA;
store a first log comprising a first state of the DSA and an I/O server;
remove the failed DSD from a logical path of the DSA;
distribute redundant copies of data between a plurality of DSDs in the logical path of the DSA;
detect a replacement DSD in an enclosure that replaces the failed DSD;
determine, based on reading data in a metadata sector of the replacement DSD, that the replacement DSD is used, and in response erase all data in the metadata sector;
add the replacement DSD to the logical path of the DSA;
store a second log comprising a second state of the DSA and the I/O server;
compare the first log and second log; and
display an indication of a state of the DSA based on the comparing.

7. The computer program product of claim 6, the computer-readable code further configured to distribute the redundant copies of data between a plurality of DSDs in the logical path of the DSA after placing the replacement DSD in the logical path of the DSA.

8. The computer program product of claim 6 wherein the DSA is one of a declustered array and a RAID array.

9. The computer program product of claim 6 wherein detecting a failed DSD in the DSA comprises placing a good DSD of the plurality of DSD's in a failed state.

10. The computer program product of claim 6 wherein detecting a replacement DSD in the enclosure comprises displaying on the failed DSD an indicator to remove the failed DSD.

11. A method for data storage device replacement and test comprising:
- detecting a failed data storage device (DSD) in a data storage array (DSA), comprising:
  - detecting that the DSA has removed the failed DSD from a logical definition of the DSA;
- storing a first log comprising a first state of the DSA and an I/O server;
- removing the failed DSD from a logical path of the DSA;
- distributing redundant copies of data between a plurality of DSDs in the logical path of the DSA;
- detecting a replacement DSD in an enclosure that replaces the failed DSD;
- determining, based on reading data in a metadata sector of the replacement DSD, that the replacement DSD is used, and in response erasing all data in the metadata sector;
- adding the replacement DSD to the logical path of the DSA;
- storing a second log comprising a second state of the DSA and the I/O server;
- comparing the first log and second log; and
- displaying an indication of a state of the DSA based on the comparing.

12. The method of claim 11, the method further comprising distributing the redundant copies of data between a plurality of DSDs in the logical path of the DSA after placing the replacement DSD in the logical path of the DSA.

13. The method of claim 11 wherein the DSA is one of a declustered array and a RAID array.

14. The method of claim 11 wherein detecting a failed DSD in the DSA comprises placing a good DSD of the plurality of DSD's in a failed state.

* * * * *